United States Patent
Doppler et al.

(10) Patent No.: US 8,730,828 B2
(45) Date of Patent: May 20, 2014

(54) METHOD AND APPARATUS FOR PROVIDING COOPERATIVE SPECTRUM USAGE AMONG MULTIPLE RADIO NETWORKS

(75) Inventors: Klaus Doppler, Espoo (FI); Carl Wijting, Espoo (FI)

(73) Assignee: Nokia Corporation, Espoo (FI)

( * ) Notice: Subject to any disclaimer, the term of this patent is extended or adjusted under 35 U.S.C. 154(b) by 490 days.

(21) Appl. No.: 12/994,071

(22) PCT Filed: May 22, 2008

(86) PCT No.: PCT/IB2008/052030
§ 371 (c)(1),
(2), (4) Date: Nov. 22, 2010

(87) PCT Pub. No.: WO2009/141686
PCT Pub. Date: Nov. 26, 2009

(65) Prior Publication Data
US 2011/0069630 A1    Mar. 24, 2011

(51) Int. Cl.
*H04L 12/26*    (2006.01)
(52) U.S. Cl.
USPC ............................................. 370/252
(58) Field of Classification Search
USPC .......... 370/252, 328–350; 455/424, 425, 454, 455/501
See application file for complete search history.

(56) References Cited

U.S. PATENT DOCUMENTS

| | | | |
|---|---|---|---|
| 5,548,800 A * | 8/1996 | Olds et al. ..................... | 455/12.1 |
| 6,741,837 B1 * | 5/2004 | Nakano et al. .............. | 455/67.11 |
| 2007/0081509 A1 * | 4/2007 | Ihm et al. ..................... | 370/342 |
| 2007/0202901 A1 * | 8/2007 | Hulbert .......................... | 455/501 |
| 2007/0287469 A1 | 12/2007 | Wijting et al. | |
| 2008/0186938 A1 * | 8/2008 | Okazaki ......................... | 370/343 |
| 2008/0253341 A1 * | 10/2008 | Cordeiro et al. .............. | 370/338 |
| 2009/0059856 A1 * | 3/2009 | Kermoal et al. .............. | 370/329 |
| 2012/0093028 A9 * | 4/2012 | Mese et al. ..................... | 370/254 |

FOREIGN PATENT DOCUMENTS

| | | |
|---|---|---|
| EP | 1850609 A | 10/2007 |
| WO | 2005036909 A | 4/2005 |
| WO | 2007031960 A | 3/2007 |
| WO | 2007122297 A | 11/2007 |

OTHER PUBLICATIONS

Office Action from Vietnamese Application No. 1-2010-03121, dated Apr. 6, 2011, 2 pages.
International Search Report and Written Opinion of the International Searching Authority for PCT Application No. PCT/IB2008/052030, dated Feb. 25, 2009, 15 pages.
Akyildiz et al., "Next GenerationlDynamic Spectrum Access/Cognative Radio Wireless Networks: A Survey" Computer Networks, Elsevier Science Publishers B.V., Amsterdam, NL, vol. 50, No. 13, Sep. 15, 2006.

* cited by examiner

*Primary Examiner* — Chi Pham
*Assistant Examiner* — Fahmida Chowdhury
(74) *Attorney, Agent, or Firm* — Squire Sanders (US) LLP

(57) ABSTRACT

An approach is provided for cooperatively sharing spectrum. A threshold value associated with an acceptable level of interference to a first radio network is determined. A beacon message specifying the threshold value is generated for transmission from the first radio network to one or more nodes of a second radio network that is configured to exchange traffic for mobile services. The first radio network and the second radio network share spectral resources including adjacent bands for the respective radio networks, and the beacon message is used for controlling the level of interference to the first radio network caused by the one or more nodes of the second radio network.

19 Claims, 18 Drawing Sheets

METHOD AND APPARATUS FOR PROVIDING COOPERATIVE SPECTRUM USAGE AMONG MULTIPLE RADIO NETWORKS

RELATED APPLICATION

This application was originally filed as PCT Application No. PCT/IB2008/052030 on May 22, 2008 which is incorporated herein by reference in its entirety.

BACKGROUND

Radio communication systems, such as wireless data networks (e.g., WiMAX (Worldwide Interoperability for Microwave Access) systems, DVB (Digital Video Broadcasting)-H (Handheld) systems, and spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. Unfortunately, the emergence of new, advanced radio technologies has created an even greater demand for scarce spectral resources. One approach is to share spectrum. However, the notion of spectrum sharing by different radio systems poses significant technical challenges. Notably, interference concerns are at the forefront. Signal interference can result in service disruption and system performance degradation.

SOME EXEMPLARY EMBODIMENTS

There is therefore a need for an approach for providing cooperative spectrum sharing among a plurality of radio networks.

According to one embodiment of the invention, a method comprises determining a threshold value associated with an acceptable level of interference to a first radio network. The method also comprises generating a beacon message specifying the threshold value for transmission from the first radio network to one or more nodes of a second radio network that is configured to exchange traffic for mobile services, wherein the first radio network and the second radio network utilize spectral resources including adjacent bands for the respective radio networks, and the beacon message is used for controlling the level of interference to the first radio network caused by the one or more nodes of the second radio network.

According to another embodiment of the invention, an apparatus comprises an interference module configured to determine a threshold value associated with an acceptable level of interference to a first radio network. The apparatus also comprises logic configured to generate a beacon message specifying the threshold value for transmission from the first radio network to one or more nodes of a second radio network that is configured to exchange traffic for mobile services. The first radio network and the second radio network share spectral resources including adjacent bands, and the beacon message is used for controlling the level of interference to the first radio network caused by the one or more nodes of the second radio network.

According to another embodiment of the invention, an apparatus comprises means for determining a threshold value associated with an acceptable level of interference to a first radio network. The apparatus also comprises means for generating a beacon message specifying the threshold value for transmission from the first radio network to one or more nodes of a second radio network that is configured to exchange traffic for mobile services. The first radio network and the second radio network share spectral resources including adjacent bands, and the beacon message is used for controlling the level of interference to the first radio network caused by the nodes of the second radio network.

According to another embodiment of the invention, a method comprises receiving a beacon message from a first radio network, wherein the beacon message includes a threshold value associated with an acceptable level of interference with the first radio network. The method also comprises adjusting a transmission parameter associated with communication over a second radio network in response to the beacon message, wherein the first radio network and the second radio network utilize spectral resources without guard bands.

According to yet another embodiment of the invention, an apparatus comprises an interference module configured to receive a beacon message from a first radio network, wherein the beacon message includes a threshold value associated with an acceptable level of interference with the first radio network, and to adjust a transmission parameter associated with communication over a second radio network in response to the beacon message. The first radio network and the second radio network utilize spectral resources without guard bands.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

An apparatus, method, and software for sharing spectrum among multiple radio networks are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to Fixed Satellite Service (FSS) and wireless technologies, such as WiMAX (Worldwide Interoperability for Microwave Access) or a Third Generation Partnership Project (3GPP) Long Term Evolution (LTE) architecture, it is recognized by one of ordinary skill in the art that the embodiments of the inventions have applicability to any type of communication services and equivalent technologies.

Figure 1:
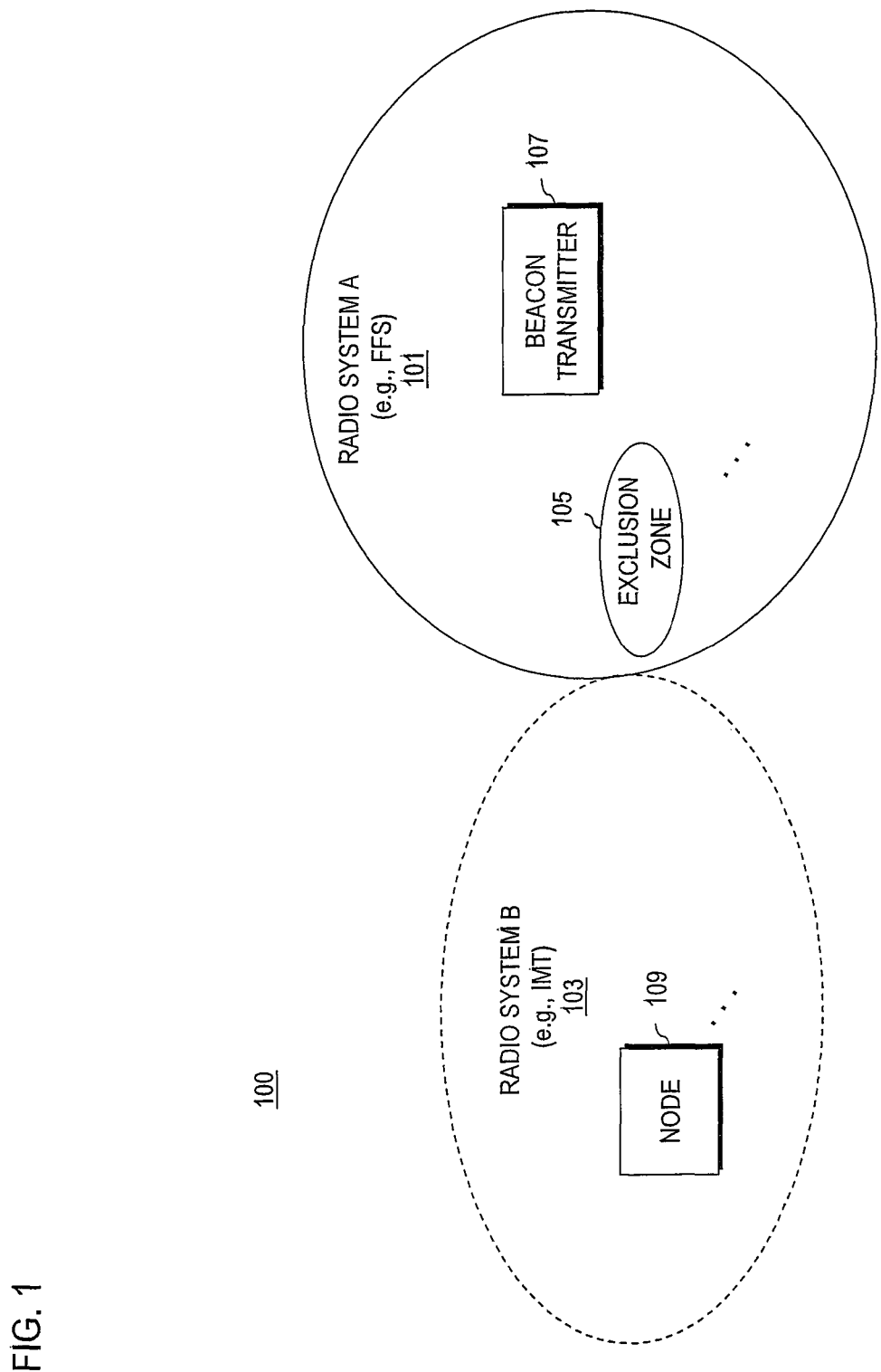
FIG. 1 is a diagram of communication systems capable of sharing spectrum, according to various exemplary embodiments of the invention.

FIG. 1 is a diagram of communication systems capable of sharing spectrum, according to various exemplary embodiments of the invention. As shown, a communication system 100 includes multiple radio systems 101, 103 (also denoted as System A and System B) for cooperatively sharing spectrum. By way of example, spectrum sharing among the different radio technologies is explained with respect to International Mobile Telecommunications (IMT) (e.g., IMT-2000 and IMT-advanced systems) and other radio interfaces (e.g., Fixed Satellite Services (FSS)). Namely, system 101 is an FSS system, while system 103 utilizes an IMT architecture, such as WiMAX. Alternatively, the architecture can be that of 3GPP LTE, to exchange traffic for mobile services. It is noted that the International Telecommunication Union (ITU) World Radio Communication Conference (WRC-07) adjusted the allocation of spectrum in various bands including the C-Band (3.4-4.2 GHz). For instance, spectrum sharing of the C-band has been suggested for use by IMT—e.g., in Region 1 (Europe and Africa), and Region 3 (Asia). Specifically, 3.4-3.6 GHz has been designated for IMT. Also, in this band, FSS satellite systems are deployed, thus making spectrum sharing a crucial feature of these radio systems.

Within the FSS system 101, exclusion zones 105 are defined, whereby no transmissions from other systems (such as IMT system 103) are permitted. That is, in these exclusion zones 105, transmissions from other systems are prohibited to avoid interference. As such, sharing of spectrum entails protecting these exclusion zones 105, which generally are defined around FSS Earth stations (ES) (not shown). The size of these exclusion zones 105 depends on the interference caused by the other system with whom the spectrum is shared. To minimize the area of the exclusion zones 105, the interference from the other systems (e.g., IMT system 103) therefore needs to be constrained.

An approach, according to certain embodiments, for limiting the interference involves transmission of a beacon from a beacon transmitter (or broadcaster) 107 for determination of interference levels as well as the location of the sources of the interference. In one embodiment, the beacon broadcaster 107 is located near an FSS Earth station. The operation of the beacon broadcaster 107 is further detailed with respect to FIGS. 2, and 7-10.

The beacon is received by node 109, which is a part of the radio system B. The node 109 can include any type of network element, such as a base station, relay node, a user terminal, etc.

Figure 2:
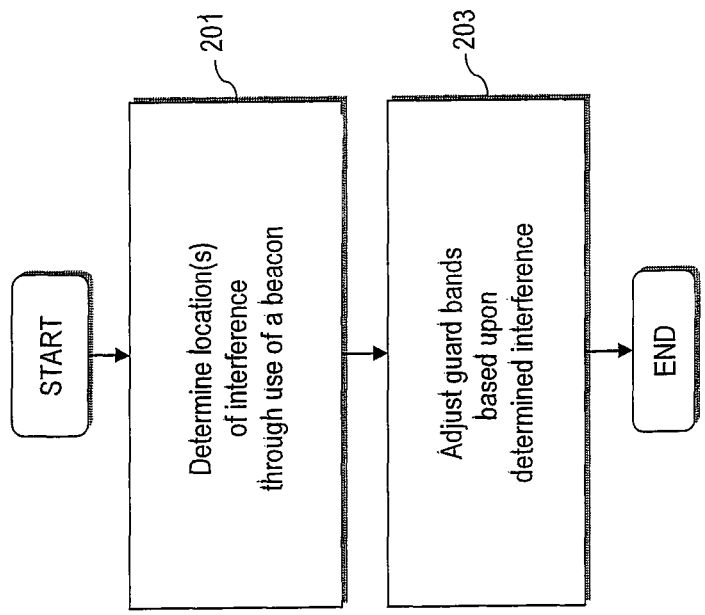
FIG. 2 is a flowchart of a process for cooperatively sharing spectrum, according to an exemplary embodiment.

FIG. 2 is a flowchart of a process for cooperatively sharing spectrum, according to an exemplary embodiment. This process provides a signaling and beaconing framework to detect the presence of another radio system and minimize potential interference. Continuing with the example of FIG. 1, the process determines from which locations within the radio system B (e.g. IMT system) the received signal of system A (e.g. Fixed Satellite System) is interfered through the use of a beacon, as in step 201. Next, guard bands, along with or alternatively with other transmission parameters, can be adjusted, per step 203, based upon these measurements (resulting in a more spectrum efficient mechanism). This approach provides more detailed information about the usage of the spectrum by the system A 101. According to certain embodiments, the systems 101, 103 can operate with no guard bands.

Further, in another embodiment, the described process can be used to locate active television reception antennas.

Figure 3:
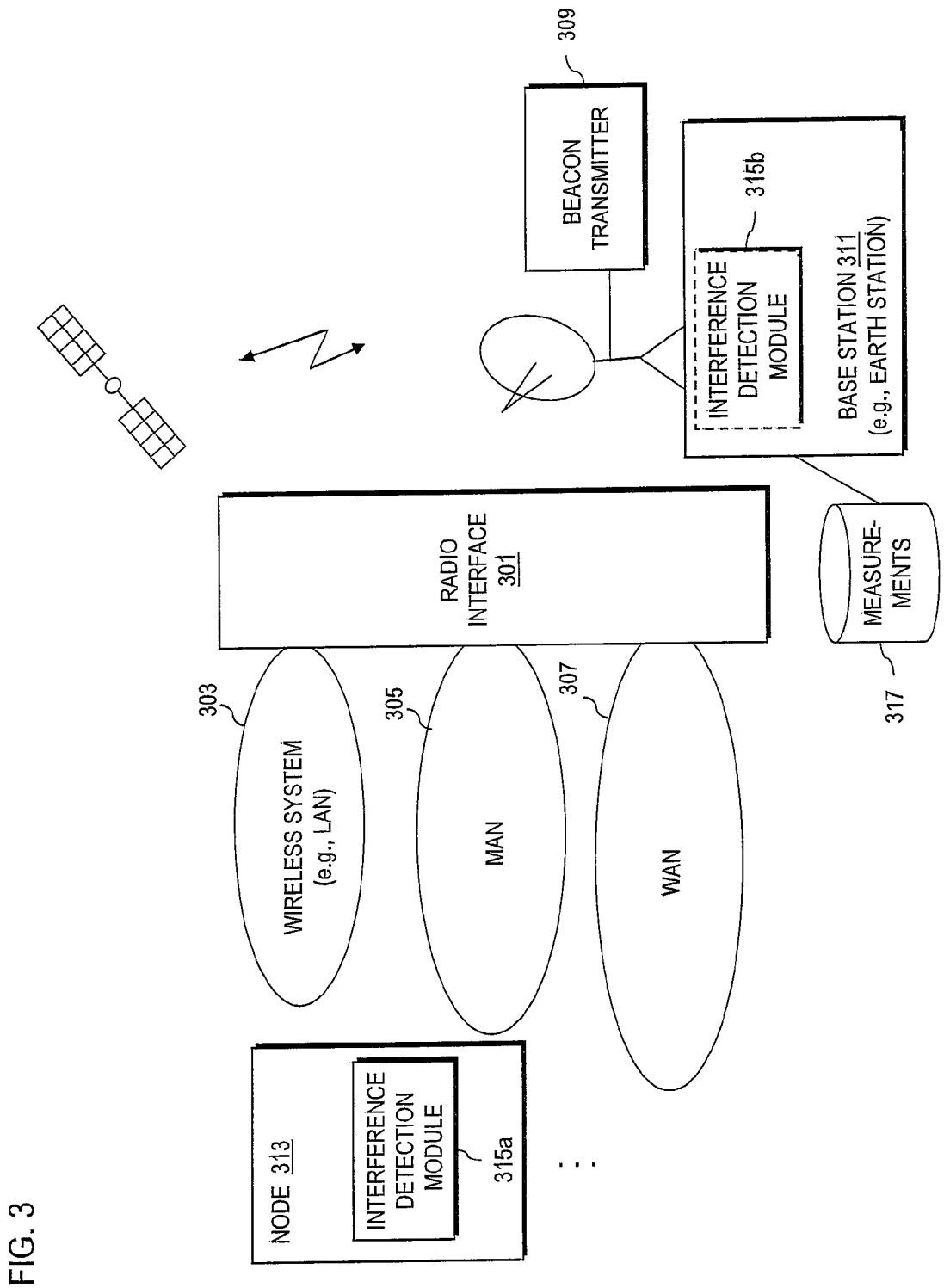
FIG. 3 is a diagram of system capable of providing a beacon message for determining interference, according to an exemplary embodiment.

FIG. 3 is a diagram of system capable of providing a beacon message for determining interference, according to an exemplary embodiment. With the co-existence of numerous wireless systems (e.g., systems 101, 103), it is desirable to develop a common radio interface 301 that is flexible and scalable, and can cover different domains 303-307 (e.g., local area, metropolitan area, and wide area).

In one embodiment, a beacon message can be transmitted from a beacon transmitter (or broadcaster) 309 within an immediate vicinity of (or co-located with, or having a directive antenna pointing to the same direction or sharing the same antenna) as a receiving antenna of an Earth station 311. Assuming that the transmission path followed by transmissions from receiving units, such as node 313, would be identical, this allows for the identification of interfering transmitters within the vicinity of the FSS Earth station 311. The interfering transmitter 313 may be any type of base station, access point, e-NodeB, relay node, relay station, subscriber station, mobile station (MS) or user equipment, such as handsets, terminals, stations, units, devices, or any type of interface to the user (such as "wearable" circuitry, etc.).

Under this scenario of FIG. 3, an interference module 315 can reside within the node 313 to measure the received signal from the beacon broadcaster 309 for determining the amount of interference introduced to (or "inflicted" on) the satellite system 101. Alternatively, the interference module 315 can be situated in the base station 311 of the system 101, which can perform measurements (e.g., dynamically) and in turn can send a control message with the information to the node 313. In one embodiment, such signaling can be performed out-of band using a control channel of the base station 311 instead of a beacon signal. As such, the node 313 would not be required to perform measurements.

In addition to the dynamic measurements, the base station 311, in an exemplary embodiment, can track of the locations where the beacons are received and store such information (as well as measurement information) in a database 317. Thus, this permits infrequent measurements in cells/areas where no satellite receiver has been detected before.

Figure 4A:
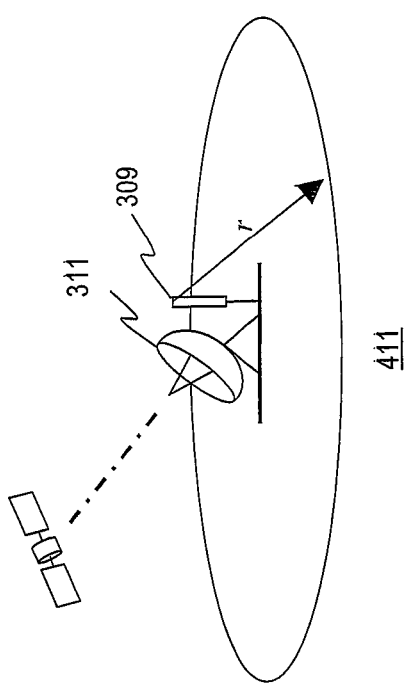
FIGS. 4A-4C are diagrams of beaconing configurations, according to various exemplary embodiments.
Figure 4C:
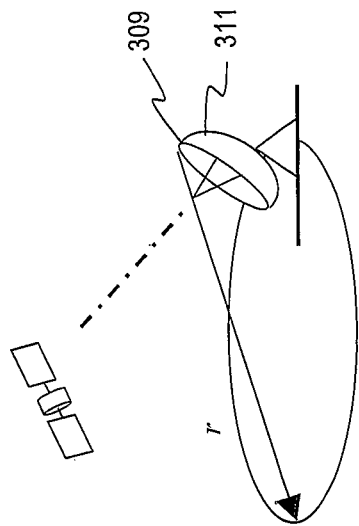
Figure 4B:
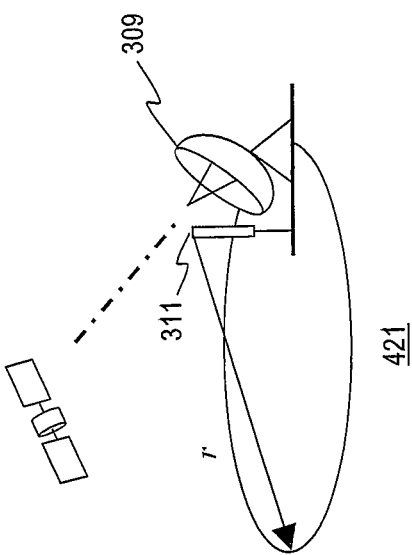

FIGS. 4A-4C are diagrams of beaconing configurations, according to various exemplary embodiments. Three different basic configurations for transmitting the beacons are depicted; each configuration requires different levels of cooperation between the satellite system 101 and the IMT system 103. As seen in FIG. 4A, configuration 411 provides placement of an antenna (e.g., omni-directional) collocated with the satellite system. One issue is the selection of the transmit (Tx) power of the beacon since it should cover a larger range than typical cell sizes. The use of an omni-directional antenna results in a "circular" exclusion zone. However, a typical satellite Earth station antenna has a half power beamwidth of less than 3 degrees. Thus, the exclusion zone covers an area that can be 100 times larger than the required exclusion zone. Under traditional approaches, large exclusion zones around the Earth stations have been proposed—e.g., minimum exclusion zones are in the order of magnitude of 4000 km$^2$ (40 km radius) have been suggested.

According to one embodiment, the beacon may use a spreading code sequence to increase the transmission range of the beacon signal. Parameters, such as frequency (how often) the beacon is transmitted, the time duration and the carrier frequency, are configurable, and depend on the radio technologies involved. If the duration is sufficiently short and/or the frequency separation together with the transmit filters is large enough, then the satellite system is not interfered significantly by the beacon signal. Further, isolation between the satellite antenna and the transmitted beacon may be provided, according to certain embodiments.

In an exemplary embodiment, instead of an omni-directional antenna, a ring of directional antennas or antenna elements may be used to limit the interference to the satellite antenna.

In FIG. 4B, configuration 421 involves placement of a directional antenna pointing to the same direction and collocated with the satellite system. Because this configuration 421 uses a directional antenna, a much larger geographical area is made available for transmissions compared to a circular shaped exclusion zone that is obtained when using omni-directional antennas. For a 60 degree sector antenna, the exclusion zone can still be 20 times larger than required.

In the configuration 431 of FIG. 4C, the beacon can be transmitted using the satellite antenna. Further, this configuration 431, the satellite antenna itself is used for the beacon transmission (rather than a separate beacon broadcaster), ensuring that the signal is received in the exactly the same area as from where interference would be perceived from transmitting nodes (e.g., base station, relay node, etc.). Satellite antennas have typically a 3 dB beamwidth of 3 degrees, and antenna gains of 40 dBi. Thus, by using the satellite antenna itself, the exclusion zone can be restricted to the actual area where it is required.

For all three scenarios of FIGS. 4A-4C, the IMT system 103 can cooperate with the FSS system 101 to enable determination of interference. In an exemplary embodiment, the beacon can, for example, contain a threshold value that is based on measurements by the satellite system 101. The threshold value ensures that the IMT system 103 is not inflicting harmful interference to the satellite system 101. It is noted that the threshold value could also be transmitted by the IMT system 103. As such, the threshold value can be independently transmitted instead of utilizing a beacon message. In this case, the IMT system 103 obtains information about the interference level to the satellite system 101; alternatively, the IMT system 103 use a maximum interference power budget (e.g., that is pre-defined) and adjusts the threshold value accordingly.

The size of the exclusion zone (e.g., 40km radius) takes the worst case into account (i.e., line of sight (LOS)). However, it is noted that typical areas do not have a LOS connection to the FSS; and even for omni-directional antenna, the exclusion zone can be significantly decreased. Using a sector antenna and the satellite antenna itself further reduces the size of the exclusion zone. When using the satellite antenna itself the mobile communication system (e.g., IMT system 103) can use almost all of the area of the worst case exclusion zone.

Although the above configurations are depicted in the context of a satellite Earth station, it is contemplated that other radio systems, such as a television broadcast system, can utilize receive antennas equipped with beacon transmitters to avoid interference.

Figure 5:
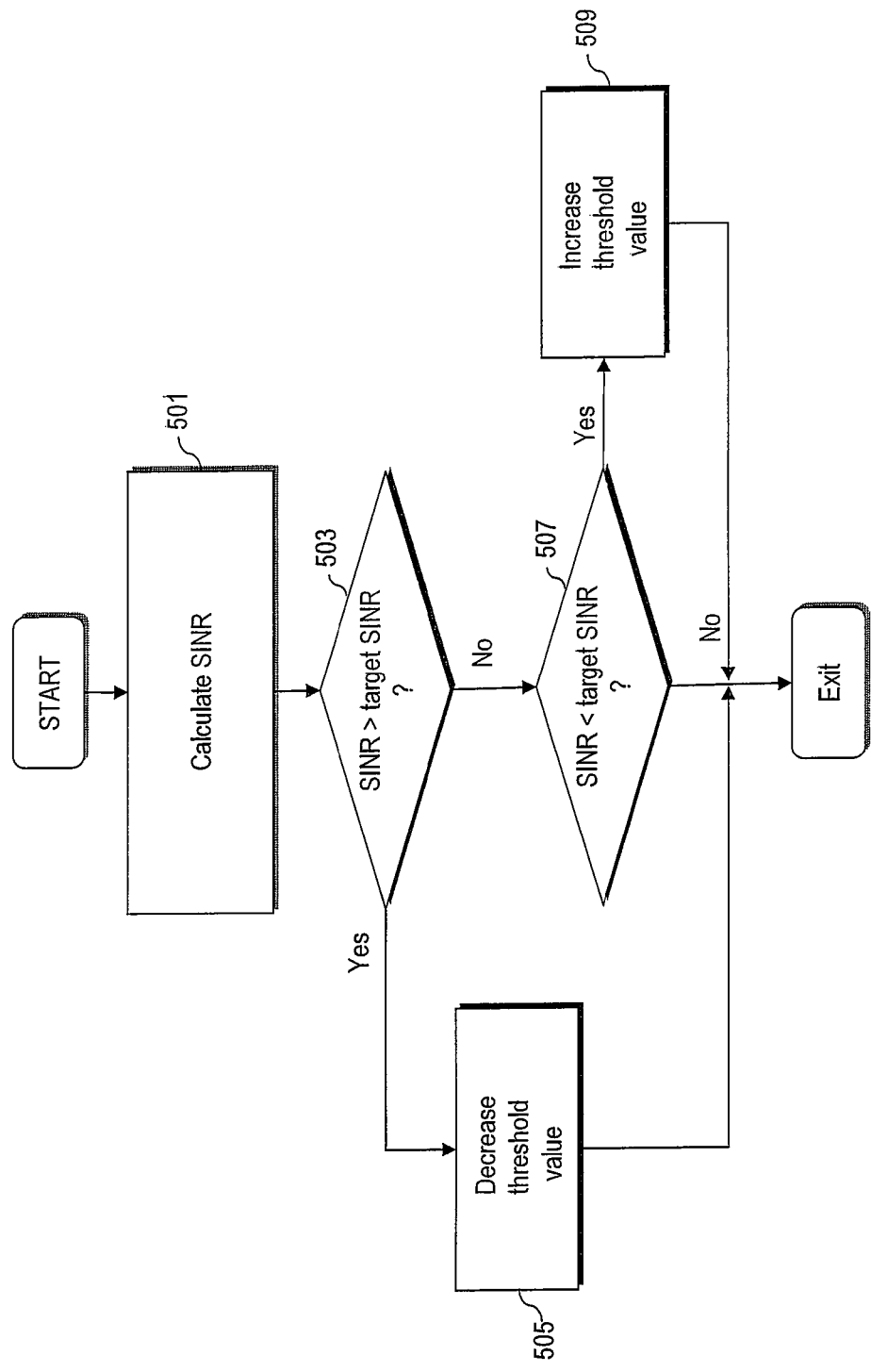
FIG. 5 is a flowchart of a process for adjusting a threshold based on signal to interference plus noise ratio (SINR), according to an exemplary embodiment.

FIG. 5 is a flowchart of a process for adjusting a threshold based on signal to interference plus noise ratio (SINR), according to an exemplary embodiment. In this process, the FSS system 101 measures the SINR of its received signal and adjusts threshold value contained in the transmitted beacon. In general, satellite systems are designed with a margin against fluctuations of the SINR values. This margin is used to accommodate, for instance, fluctuations in environmental conditions, such as weather changes. The margin can also be used to accommodate a certain amount of the interference (irrespective of weather conditions), and the threshold set in the beacon can be adjusted accordingly. In other words the satellite system 101 estimates the SINR of its received signal, as in step 501. Thereafter, if the SINR is higher, as determined in step 503, than the SINR required by the FSS ES (denoted as "target SINR") then the threshold is decreased, per step 505. As in step 507, if the SINR is less than the target SINR, the threshold value is increased (step 509).

Figure 6:
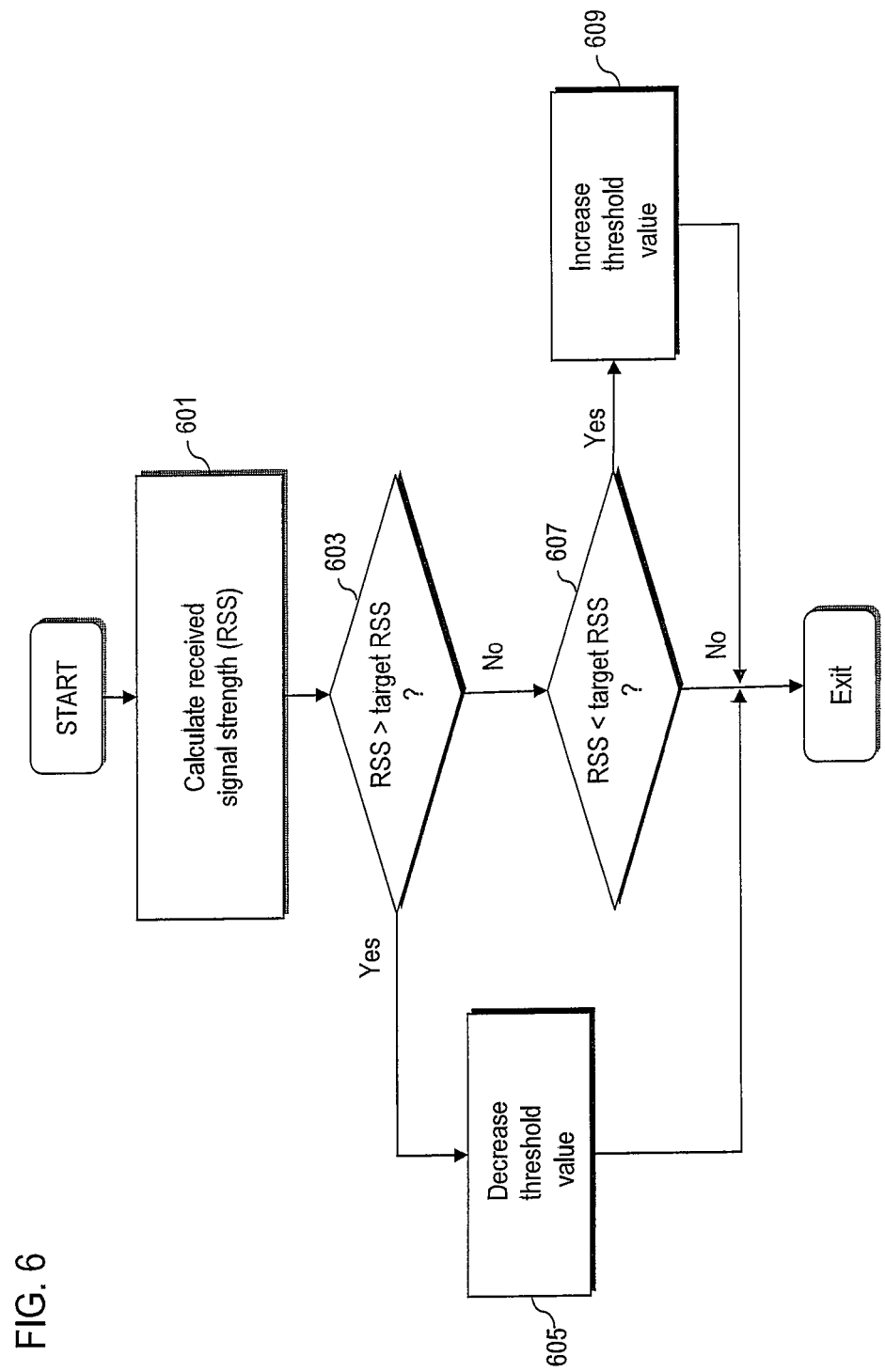
FIG. 6 is a flowchart of a process for adjusting a threshold based on received signal strength, according to an exemplary embodiment.

FIG. 6 is a flowchart of a process for adjusting a threshold based on received signal strength from the IMT system at the satellite earth station, according to an exemplary embodiment. Factors influencing the amount of perceived interference caused by the IMT system 103 include the transmit power of the individual terminals, and the number of active terminals. Using the antenna of the satellite system 101, a measurement of the received signal strength from the IMT system 103 can be performed.

In step 601, signal strength of a received signal from the IMT system 103 is determined. If the received signal strength exceeds the maximum tolerable interference level (i.e., target RSS) as determined in step 603, the threshold value to be transmitted in the beacon is decreased (step 605). If the received signal strength is below this level the threshold is increased, per steps 607 and 609.

According to one embodiment, the received interference can be measured during periods where the FSS ES does not receive from the satellite and/or by using a duplex filter and measuring the received signal strength on an adjacent band that is currently not used by the FSS system.

In the case in which no threshold value is provided by the beacon, coordination can still be performed by the systems 101, 103. If feedback is received from the FSS ES indicating that the interference is too high, the IMT system 103 can lower the maximum transmit power of the actively interfering users. This operation can be performed without broadcasting a threshold value.

Figure 7:
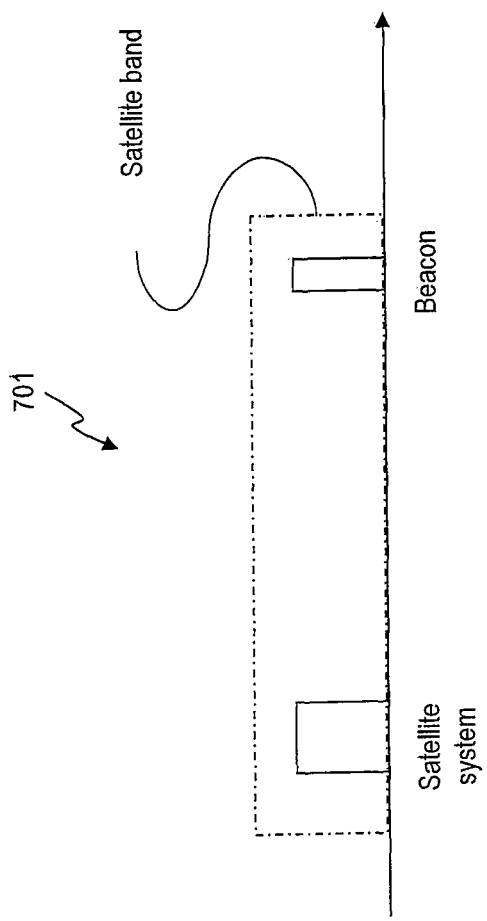
FIG. 7 is a diagram of a beacon within a satellite frequency band, according to an exemplary embodiment.

FIG. 7 is a diagram of a beacon within a satellite frequency band, according to an exemplary embodiment. Because typically the satellite system 101 does not occupy the whole C-band 701 (but rather a small portion of the spectrum), it is possible to transmit the beacon signal on a non-interfering frequency from the satellite system 101. Thus, a duplex filter can be used to separate the two signals. The propagation aspects remain identical, so that the beacon is still a good measure for the area from where the interference originates.

Accordingly, in the case in which a beacon in the satellite frequency band is transmitted on a non-interfering frequency, the threshold in the beacon combined with the measured signal strength of the beacon is used to determine how much the node has to reduce its transmit power:

$$\text{Transmit power backoff [dB]} = \text{threshold [dBm]} - \text{received signal strength [dBm]}$$

Under this scenario, it is assumed that the beacon is transmitted with the same transmit power as the transmit power used by the node 109. If the transmit powers are different, the beacon may, in an exemplary embodiment, contain a field that specifies the transmit power with which the beacon was transmitted.

Figure 8:
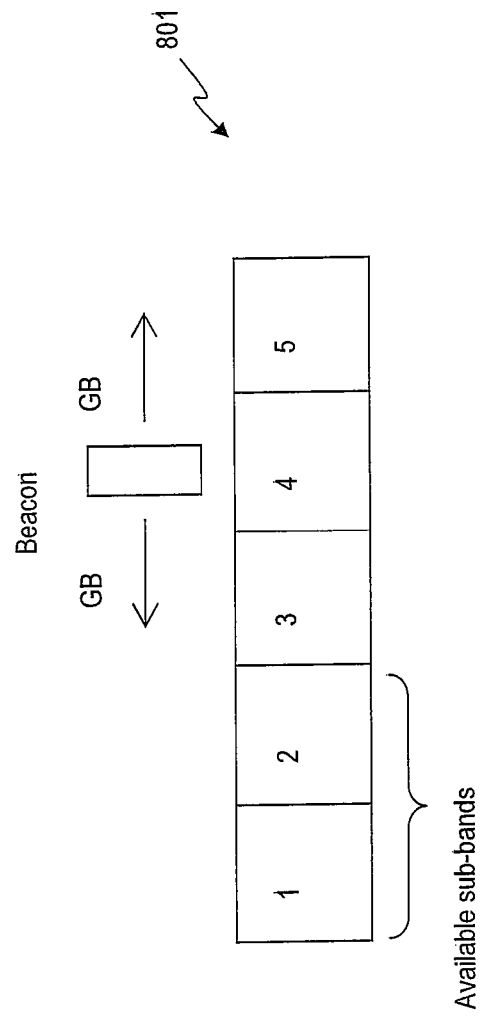
FIG. 8 is a diagram of a beacon collocated in a particular spectral band, according to an exemplary embodiment.

FIG. 8 is a diagram of a beacon collocated in a particular spectral band, according to an exemplary embodiment. In this example, the signal strength of a beacon message can be determined by a node, and the information included in the message can be used for determining the access regime to the shared band. Based upon the basic measurement of the beacon signal strength the potential interference caused to the satellite system is estimated. Also, if no beacon is received, no interference is assumed (the FSS ES is shielded sufficiently from the node). If a weak beacon is received, limited interference can be expected and if the beacon signal exceeds a threshold, then the band should be avoided.

According to one embodiment, the omni-directional antenna can provide information for the case in which the node (e.g., user terminal (UT)) is shielded, for example by a large structure or because of indoor use. The directional antenna provides more accurate information, and the use of the satellite antenna is most precise. However the latter option requires a higher level of cooperation between the satellite system 101 and IMT system 103 (or operator). The best directivity and gain is obtained using the same antenna as the satellite earth-station. When the same antenna is used to transmit the beacon signal, the satellite receiver cannot receive while the beacon is transmitted or the beacon has to be transmitted at a different frequency with sufficient separation to not cause interference to the received signal. Using the first option the interference can be most accurately estimated because the beacon is transmitted exactly at the receiver frequency. When the other options are used, an additional safety margin can be added.

As seen in FIG. 8, co-location in a particular part of the spectrum 801 in the C-band (where 5 sub-channels) is assumed. Based on the estimated interference to the satellite system 101, the UT in the mobile communication system 103 will be given the following possibilities: (1) not transmit on that band because the interference is too high; (2) use a guard band or a power profile to limit the interference, whereas the guard band and the power profile depend on the interference estimated to be caused to the satellite system; or (3) use the entire band without restrictions.

With respect to option (2), the guard band and the transmit power/power profile depend on the "inflicted interference"—which depends on the spectrum (emission) mask of both systems, inter carrier distance etc. The scheme for determining these parameters is detailed in FIG. 10.

In an exemplary embodiment, the beacon can include information about the frequencies used by the satellite system 101 and their current use. To protect the privacy of the transmitter of the beacon, an alternative approach can be taken whereby available sub-channels can be signaled. The exchange of the frequencies that are used or occupied is helpful because typically satellite Earth stations use only a limited bandwidth. Secondly, the "victim" satellite receiver might be seldom active, in which case the IMT system 103 can largely operate freely.

Margins on the measurements have to be applied to incorporate mobility (high velocity use) as well as fluctuations in the environment.

Figure 9B:
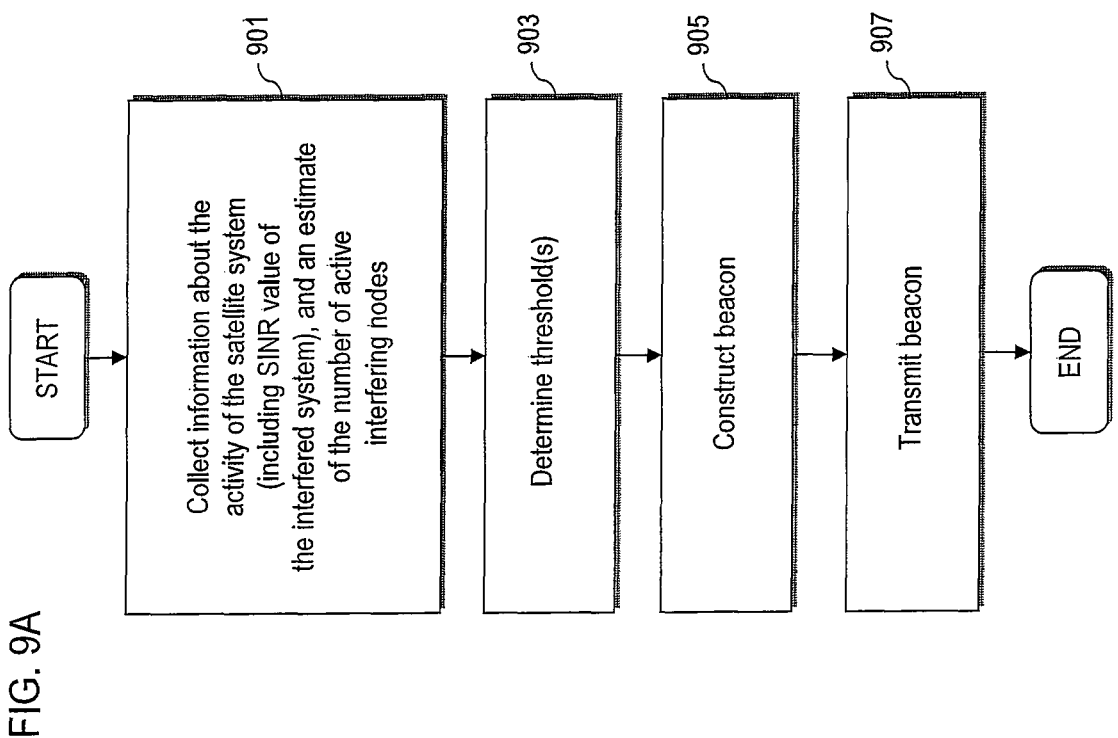
FIGS. 9A and 9B are flowcharts, respectively, of processes for transmitting and receiving a beacon, according to various exemplary embodiments of the invention.
Figure 9A:
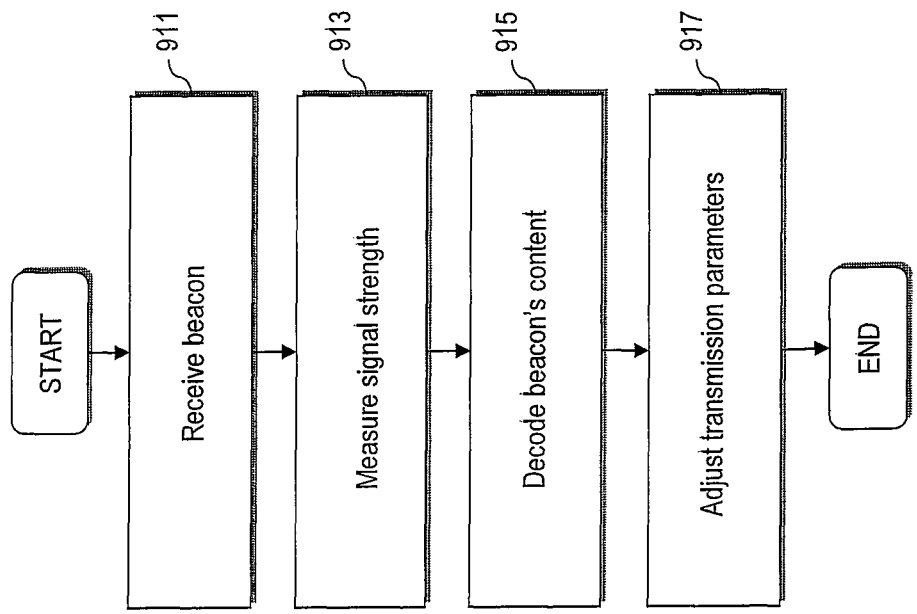

FIGS. 9A and 9B are flowcharts, respectively, of processes for transmitting and receiving a beacon, according to various exemplary embodiments of the invention. As mentioned, in one embodiment, a beacon transmitter (or broadcaster) 107 can be deployed at the site or within close proximity to the site of the transmitter with whom the spectrum is shared. From the perspective of the transmitter 107 (FIG. 9A), information about the activity of the satellite system 101 is collected, per step 901. In an exemplary embodiment, the collected information can include SINR value of the received signal of the satellite system 101, and an estimate of the number of active interfering nodes in the IMT system 103. Next, the threshold(s) are determined, as in step 903. At this point, the beacon signal or message can be generated and subsequently transmitted, as in steps 905 and 907.

As mentioned, the number of interfering stations from the IMT system 103 can negatively impact the FSS system 101. The extent to which the threshold value should be lowered to reduce the interference to the FSS system 101 depends on the active number of stations (mobile terminals, access points) that contribute to the interference. The threshold can be lowered further, if only a few stations of the IMT system 103 contribute to the interference. For many active interferes, a smaller adjustment of the threshold can be sufficient. The IMT system 103, in an exemplary embodiment, will report the number of interfering stations; the threshold adjustment will depend on this information.

In one embodiment, it is assumed that the IMT system 103 has knowledge of the position of the mobile terminals (e.g., sector/site ID, geographical coordinates) and access points. The knowledge about the number of potential interfering active mobile terminals or access points can be based on beacon signal strength measurements or the position of the mobile terminals/access points.

In determining the threshold value, the FSS system 101 can utilize the described processes for reporting whether the interference would be too high/lower than the allowed interference to the IMT system 103. The IMT system 103 can determine the position of the mobile terminals (at least sector/site ID) and access points. If the interference is too high, the system 103 can limit the transmit power of those stations (e.g., mobile terminals and access points) that interfere with the satellite system 101. The amount of transmit power reduction will depend on how much the interference exceeds the allowed interference and the amount of stations that contribute to the interference.

When determining the threshold, the transmit power of the beacon and the maximum power of the mobile terminal are used as input:

$$\text{Threshold [dBm]} = I_{max}/n_{active} \text{[dBm]} + C_{cal} \text{[dB]} + C_{margin} \text{[dB]} + \Delta\text{Threshold},$$

where $I_{max}$ determines the maximum interference tolerated by the satellite system 101, and $n_{active}$ the number of active terminals. $C_{cal}$ is a calibration constant that corrects possible power differences between the max transmit power of the mobile terminal and the transmit power of the beacon. $C_{margin}$ is a constant that compensates, for example, for inaccuracies in measurements. ΔThreshold is optional and depends on the feedback from the measurements, e.g., SINR of the signal received by the satellite system 101, in addition to other factors. The feedback can vary with the weather condition and the actual amount of active interfering mobile terminals and their activity level. It is noted that only the maximum interference needs to be defined—i.e., no feedback is required from the satellite system 101.

The number $n_{active}$ of actively interfering users could be estimated by the IMT system 103 as the number of active users in a certain area known to be interfering the satellite system. Alternatively, users receiving the beacon could report this to the BS (not shown) of the IMT system 103, after which the total number of interfering nodes could be determined.

The nodes, e.g., user terminals or base stations, according to certain embodiments, can be configured to receive the beacon messages, to process such messages, and act accordingly (using predetermined policies and rules). As shown in FIG. 9B, a beacon message is received, as in step 911. In step 913, the signal strength associated with the beacon message or signal is determined. Next, the content of the beacon message is examined (or decoded) (step 915). In step 917, transmission parameters are adjusted according to the content.

According to one embodiment, the nodes can forward information about detected beacons to the node 109 (e.g., BS) of the IMT system 103. In the case the BS 109 performs the measurement an appropriate control channel is used to forward the information (e.g., via a broadcast channel) to the nodes.

Figure 10:
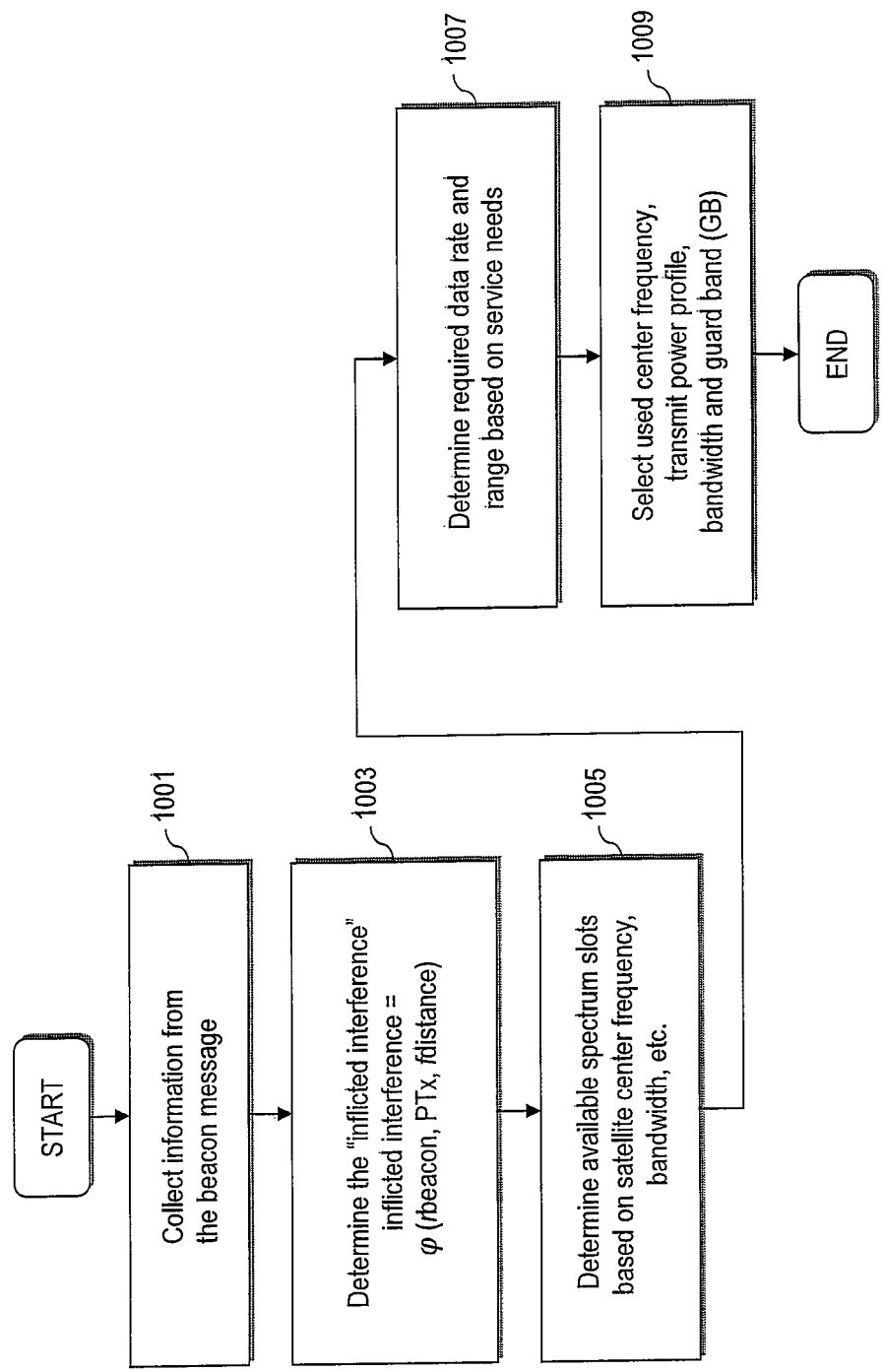
FIG. 10 is a flowchart of a process for adjusting transmission parameters for cooperatively sharing spectrum, according to an exemplary embodiment.

FIG. 10 is a flowchart of a process for adjusting transmission parameters for cooperatively sharing spectrum, according to an exemplary embodiment. In step 1001, information from the beacon message is collected. The "inflicted interference" is determined as follows:

$$\text{Inflicted Interference} = \phi(r_{beacon}, P_{Tx}, f_{distance}),$$

Where $\phi(\cdot)$ is a function that determines the interference strength and can account for certain a priori knowledge, such as assumptions about the spectrum masks of the transmitters, etc.; $r_{beacon}$ is the received signal strength of the beacon; $P_{Tx}$ is the transmit power; and $f_{distance}$ is the separation distance of the carrier frequencies.

The described processes, according to various embodiments, enable spectrum sharing between two different radio systems (e.g., IMT and FSS). Also, these processes permit more efficient use of spectral resources, while reducing exclusion zones.

Figure 11A:
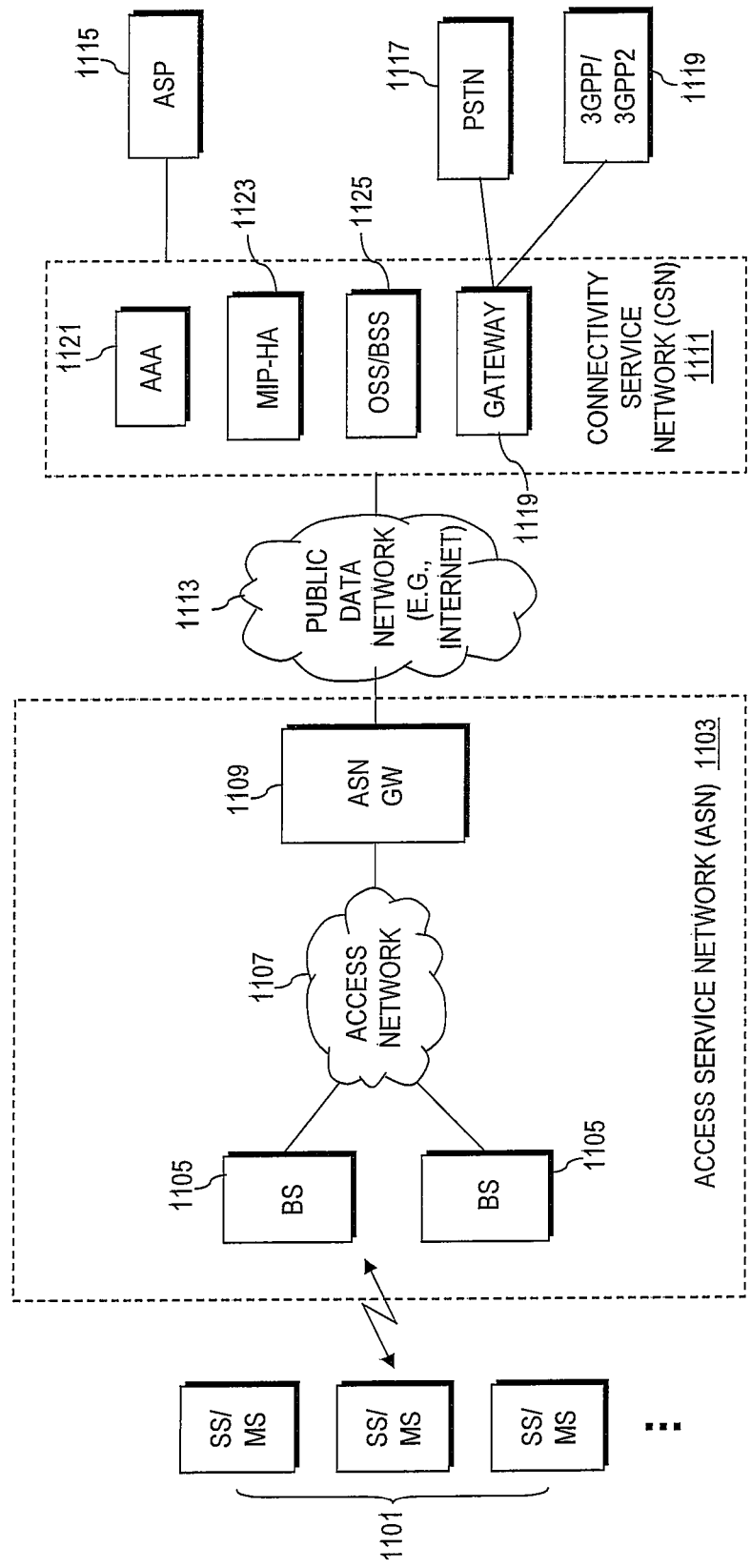
FIGS. 11A and 11B are diagrams of an exemplary WiMAX (Worldwide Interoperability for Microwave Access) architecture, in which the system of FIG. 3 can operate, according to various exemplary embodiments of the invention.
Figure 11B:
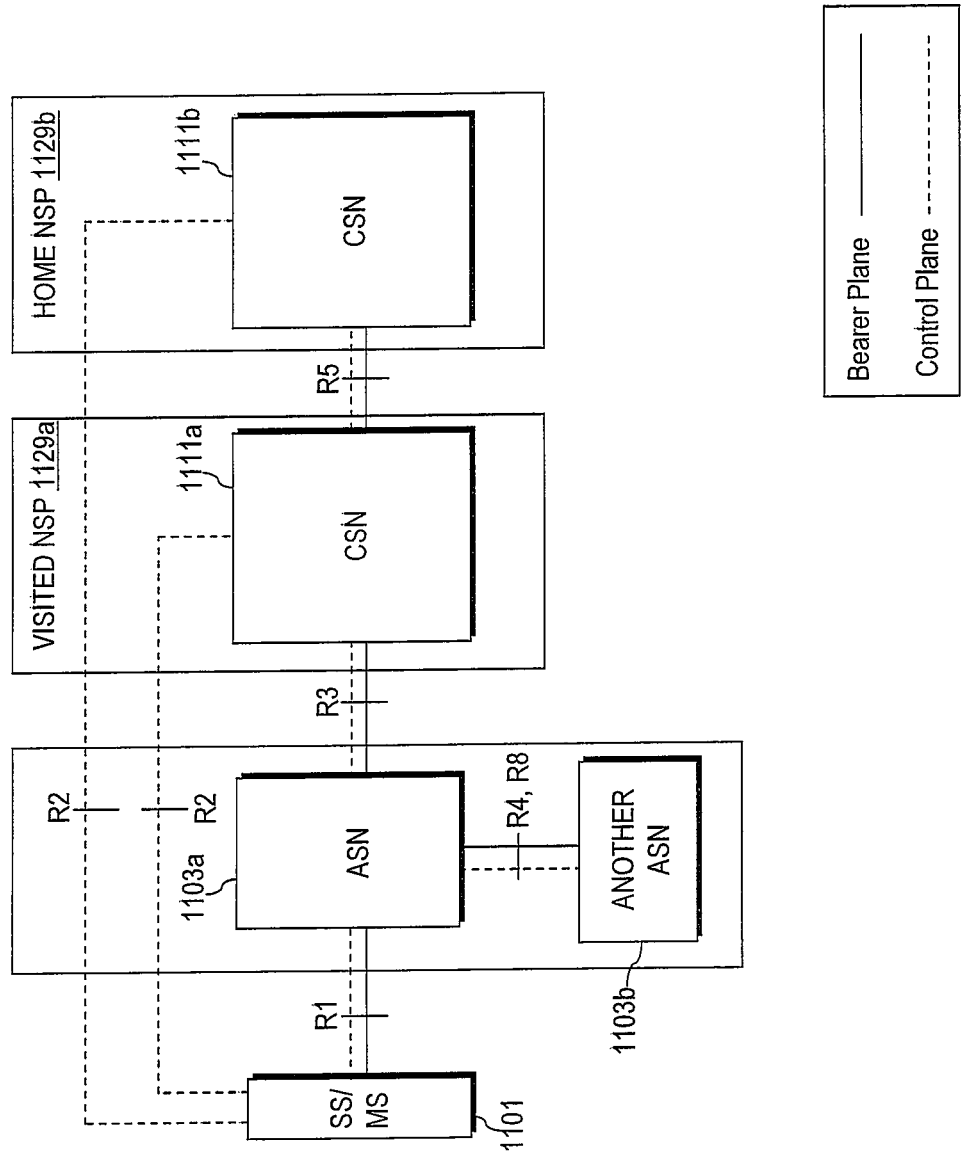

FIGS. 11A and 11B are diagrams of an exemplary WiMAX architecture, in which the system of FIG. 3, according to various exemplary embodiments of the invention. The architecture shown in FIGS. 11A and 11B can support fixed, nomadic, and mobile deployments and be based on an Internet Protocol (IP) service model.

Subscriber or mobile stations 1101 can communicate with an access service network (ASN) 1103, which includes one or more base stations (BS) 1105. In this exemplary system, the BS 1105, in addition to providing the air interface to the mobile stations 1101, possesses such management functions as handoff triggering and tunnel establishment, radio resource management, quality of service (QoS) policy enforcement, traffic classification, DHCP (Dynamic Host Control Protocol) proxy, key management, session management, and multicast group management.

The base station 1105 has connectivity to an access network 1107. The access network 1107 utilizes an ASN gateway 1109 to access a connectivity service network (CSN) 111 over, for example, a data network 1113. By way of example, the network 1113 can be a public data network, such as the global Internet.

The ASN gateway 1109 provides a Layer 2 traffic aggregation point within the ASN 1103. The ASN gateway 1109 can additionally provide intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN 1111.

The CSN 1111 interfaces with various systems, such as application service provider (ASP) 1115, a public switched telephone network (PSTN) 1117, and a Third Generation Partnership Project (3GPP)/3GPP2 system 1119, and enterprise networks (not shown).

The CSN 1111 can include the following components: Access, Authorization and Accounting system (AAA) 1121, a mobile IP-Home Agent (MIP-HA) 1123, an operation support system (OSS)/business support system (BSS) 1125, and a gateway 1127. The AAA system 1121, which can be implemented as one or more servers, provide support authentication for the devices, users, and specific services. The CSN 1111 also provides per user policy management of QoS and security, as well as IP address management, support for roaming between different network service providers (NSPs), location management among ASNs.

FIG. 11B shows a reference architecture that defines interfaces (i.e., reference points) between functional entities capable of supporting various embodiments of the invention. The WiMAX network reference model defines reference points: R1, R2, R3, R4, and R5. R1 is defined between the SS/MS 1101 and the ASN 1103a; this interface, in addition to the air interface, includes protocols in the management plane. R2 is provided between the SS/MS 1101 and a CSN (e.g., CSN 1111a and 1111b) for authentication, service authorization, IP configuration, and mobility management. The ASN 1103a and CSN 1111a communicate over R3, which supports policy enforcement and mobility management.

R4 is defined between ASNs 1103a and 1103b to support inter-ASN mobility. R5 is defined to support roaming across multiple NSPs (e.g., visited NSP 1129a and home NSP 1129b).

As mentioned, other wireless systems can be utilized, such as 3GPP LTE, as next explained.

FIGS. 12A-12D are diagrams of communication systems having exemplary long-term evolution (LTE) architectures, in which the user equipment (UE) and the base station of FIG. 1 can operate, according to various exemplary embodiments of the invention. By way of example (shown in FIG. 12A), a base station (e.g., destination node 109) and a user equipment (UE) (e.g., source node 109) can communicate in system 1200 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 12A:
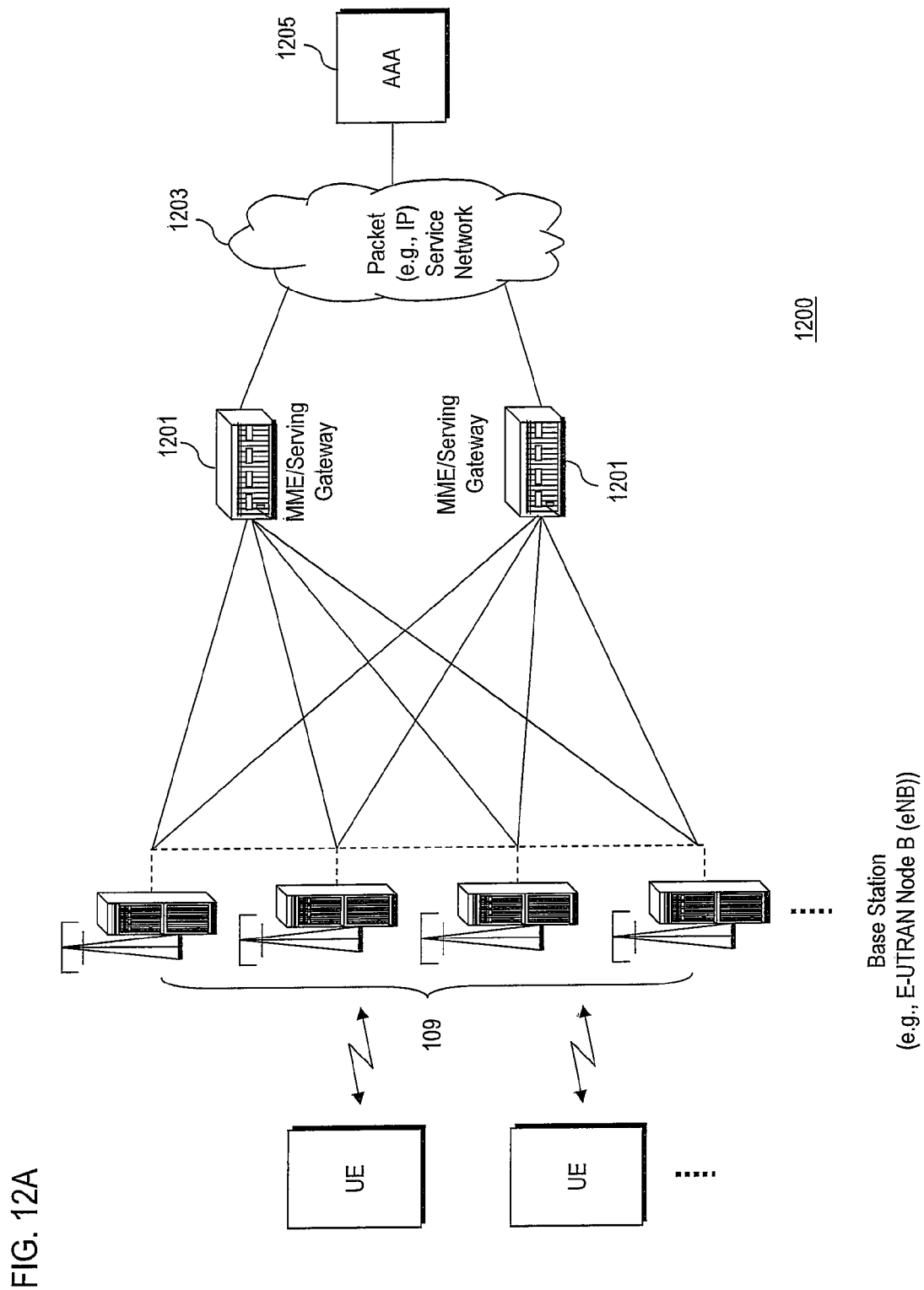
FIGS. 12A-12D are diagrams of communication systems having exemplary long-term evolution (LTE) and E-UTRA (Evolved Universal Terrestrial Radio Access) architectures, in which the system of FIG. 1 can operate to provide resource allocation, according to various exemplary embodiments of the invention.

The communication system 1200 is compliant with 3GPP LTE, entitled "Long Term Evolution of the 3GPP Radio Technology" (which is incorporated herein by reference in its entirety). As shown in FIG. 12A, one or more user equipment (UEs) communicate with a network equipment, such as a base station 109, which is part of an access network (e.g., WiMAX (Worldwide Interoperability for Microwave Access), 3GPP LTE (or E-UTRAN or 8.9G), etc.). Under the 3GPP LTE architecture, base station 109 is denoted as an enhanced Node B (eNB).

MME (Mobile Management Entity)/Serving Gateways 1201 are connected to the eNBs 109 in a full or partial mesh configuration using tunneling over a packet transport network (e.g., Internet Protocol (IP) network) 1203. Exemplary functions of the MME/Serving GW 1201 include distribution of paging messages to the eNBs 109, termination of U-plane packets for paging reasons, and switching of U-plane for support of UE mobility. Since the GWs 1201 serve as a gateway to external networks, e.g., the Internet or private networks 1203, the GWs 1201 include an Access, Authorization and Accounting system (AAA) 1205 to securely determine the identity and privileges of a user and to track each user's activities. Namely, the MME Serving Gateway 1201 is the key control-node for the LTE access-network and is responsible for idle mode UE tracking and paging procedure including retransmissions. Also, the MME 1201 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 12B:
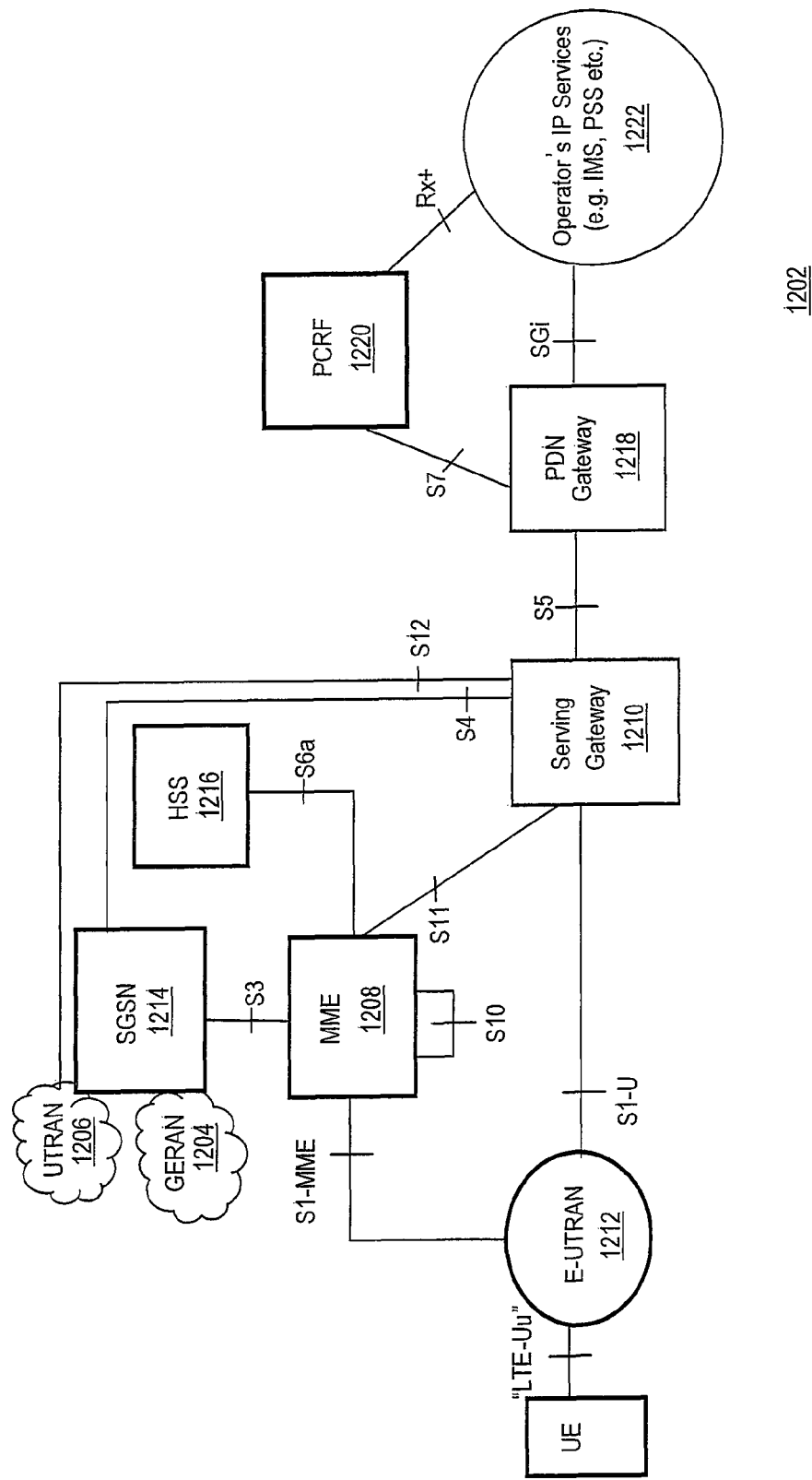

In FIG. 12B, a communication system 1202 supports GERAN (GSM/EDGE radio access) 1204, and UTRAN 1206 based access networks, E-UTRAN 1212 and non-3GPP (not shown) based access networks, and is more fully described in TR 23.882, which is incorporated herein by reference in its entirety. A key feature of this system is the separation of the network entity that performs control-plane functionality (MME 1208) from the network entity that performs bearer-plane functionality (Serving Gateway 1210) with a well defined open interface between them S11. Since E-UTRAN 1212 provides higher bandwidths to enable new services as well as to improve existing ones, separation of MME 1208 from Serving Gateway 1210 implies that Serving Gateway 1210 can be based on a platform optimized for signaling transactions. This scheme enables selection of more cost-effective platforms for, as well as independent scaling of, each of these two elements. Service providers can also select optimized topological locations of Serving Gateways 1210 within the network independent of the locations of MMEs 1208 in order to reduce optimized bandwidth latencies and avoid concentrated points of failure.

As seen in FIG. 12B, the E-UTRAN (e.g., eNB) 1212 interfaces with UE 109 via LTE-Uu. The E-UTRAN 1212 supports LTE air interface and includes functions for radio resource control (RRC) functionality corresponding to the control plane MME 1208. The E-UTRAN 1212 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 1208, as a key control node, is responsible for managing mobility UE identifies and security parameters and paging procedure including retransmissions. The MME 1208 is involved in the bearer activation/deactivation process and is also responsible for choosing Serving Gateway 1210 for the UE 109. MME 1208 functions include Non Access Stratum (NAS) signaling and related security. MME 1208 checks the authorization of the UE 109 to camp on the service provider's Public Land Mobile Network (PLMN) and enforces UE 109 roaming restrictions. The MME 1208 also provides the control plane function for mobility between LTE and 2G/3G access networks with the S3 interface terminating at the MME 1208 from the SGSN (Serving GPRS Support Node) 1214.

The SGSN 1214 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 1208 and HSS (Home Subscriber Server) 1216. The S10 interface between MMEs 1208 provides MME relocation and MME 1208 to MME 1208 information transfer. The Serving Gateway 1210 is the node that terminates the interface towards the E-UTRAN 1212 via S1-U.

The S1-U interface provides a per bearer user plane tunneling between the E-UTRAN 1212 and Serving Gateway 1210. It contains support for path switching during handover between eNBs 109. The S4 interface provides the user plane with related control and mobility support between SGSN 1214 and the 3GPP Anchor function of Serving Gateway 1210.

The S12 is an interface between UTRAN 1206 and Serving Gateway 1210. Packet Data Network (PDN) Gateway 1218 provides connectivity to the UE 109 to external packet data networks by being the point of exit and entry of traffic for the UE 109. The PDN Gateway 1218 performs policy enforcement, packet filtering for each user, charging support, lawful interception and packet screening. Another role of the PDN Gateway 1218 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 1220 to Policy and Charging Enforcement Function (PCEF) in the PDN Gateway 1218. The SGi interface is the interface between the PDN Gateway and the operator's IP services including packet data network 1222. Packet data network 1222 may be an operator external public or private packet data network or an intra operator packet data network, e.g., for provision of IMS (IP Multimedia Subsystem) services. Rx+ is the interface between the PCRF and the packet data network 1222.

Figure 12C:
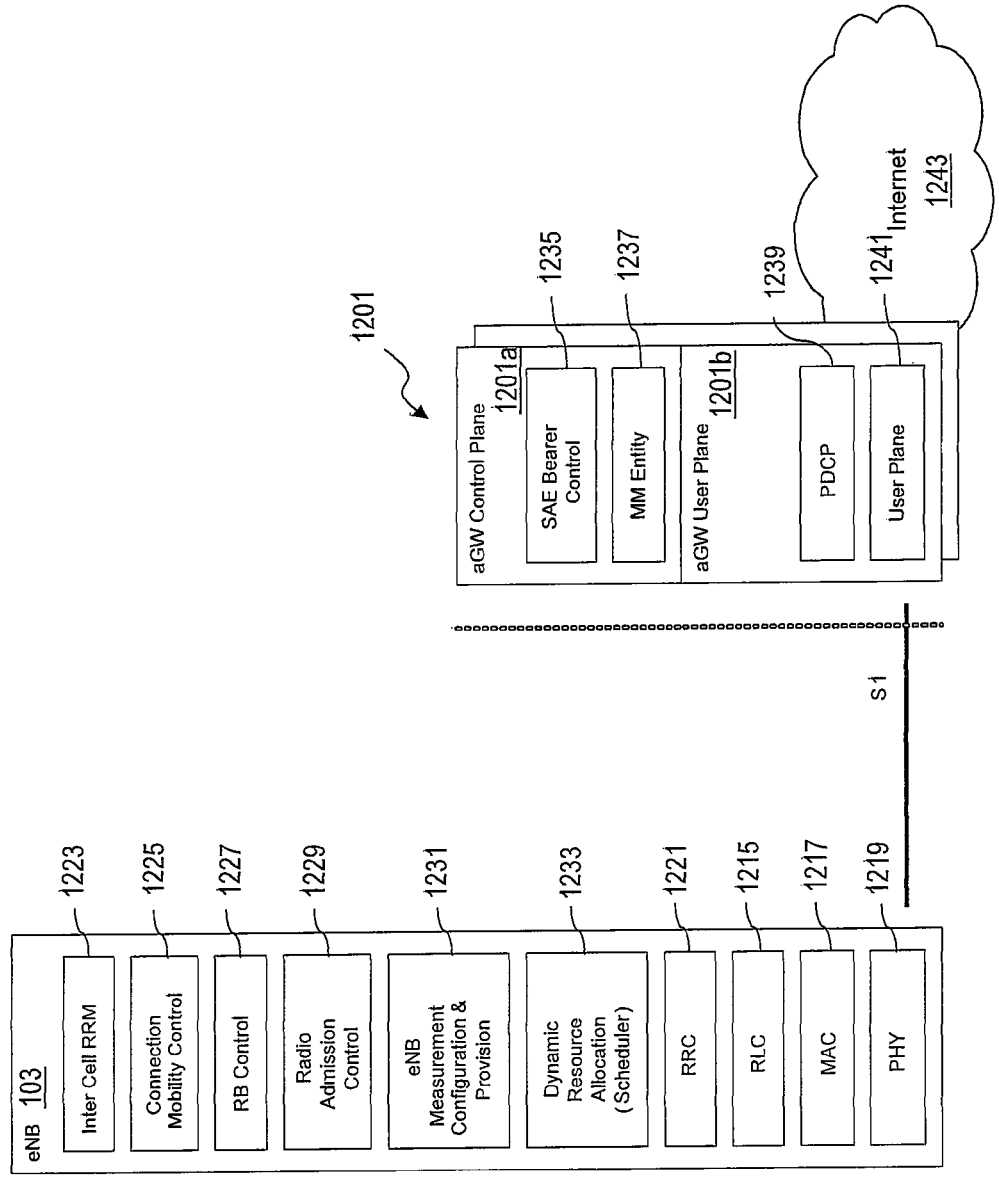

As seen in FIG. 12C, the eNB 109 utilizes an E-UTRA (Evolved Universal Terrestrial Radio Access) (user plane, e.g., RLC (Radio Link Control) 1215, MAC (Media Access Control) 1217, and PHY (Physical) 1219, as well as a control plane (e.g., RRC 1221)). The eNB 109 also includes the following functions: Inter Cell RRM (Radio Resource Management) 1223, Connection Mobility Control 1225, RB (Radio Bearer) Control 1227, Radio Admission Control 1229, eNB Measurement Configuration and Provision 1231, and Dynamic Resource Allocation (Scheduler) 1233.

The eNB 109 communicates with the aGW 1201 (Access Gateway) via an S1 interface. The aGW 1201 includes a User Plane 1201*a* and a Control plane 1201*b*. The control plane 1201*b* provides the following components: SAE (System Architecture Evolution) Bearer Control 1235 and MM (Mobile Management) Entity 1237. The user plane 1201*b* includes a PDCP (Packet Data Convergence Protocol) 1239 and a user plane functions 1241. It is noted that the functionality of the aGW 1201 can also be provided by a combination of a serving gateway (SGW) and a packet data network (PDN) GW. The aGW 1201 can also interface with a packet network, such as the Internet 1243.

Figure 12D:
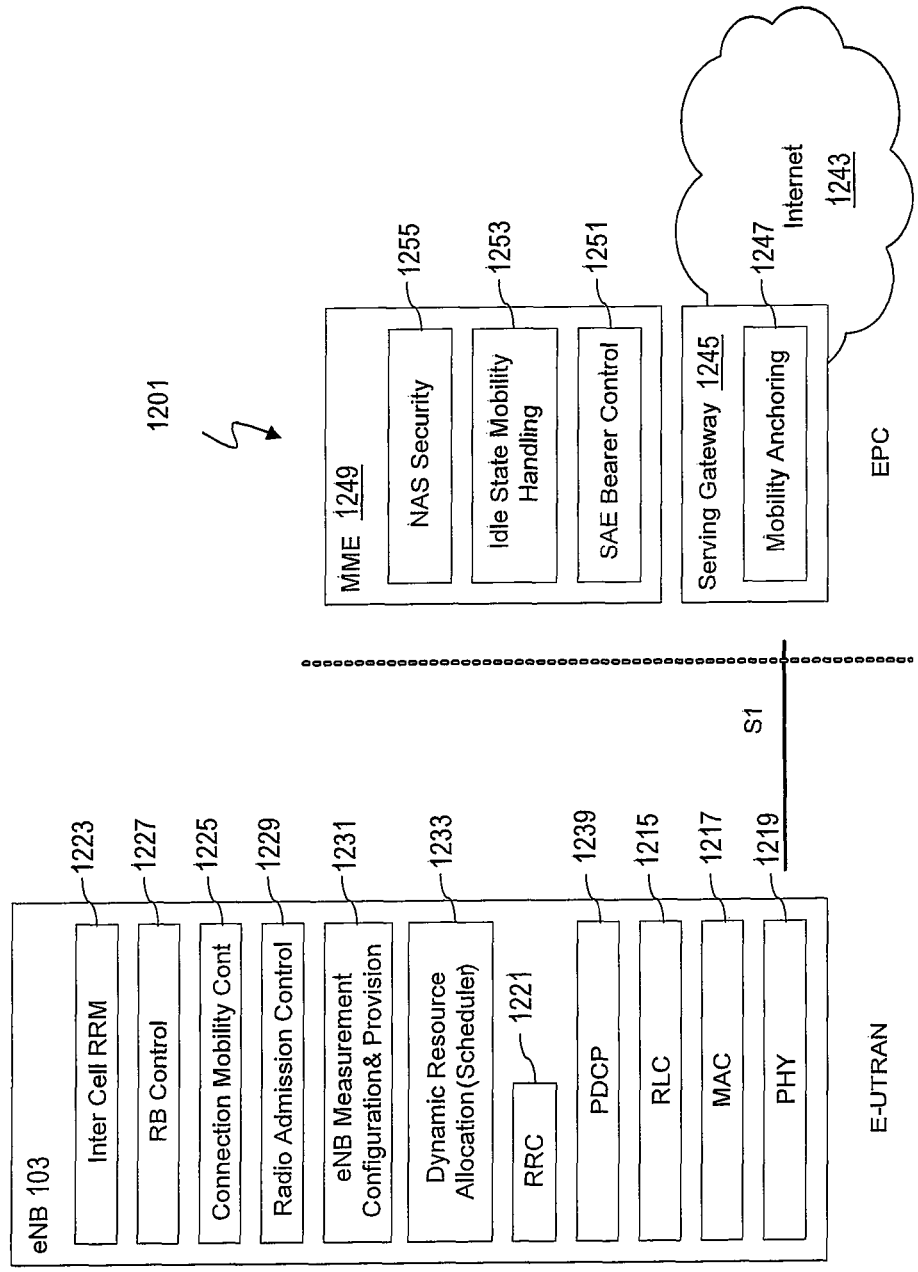

In an alternative embodiment, as shown in FIG. 12D, the PDCP (Packet Data Convergence Protocol) functionality can reside in the eNB 109 rather than the GW 1201. Other than this PDCP capability, the eNB functions of FIG. 12C are also provided in this architecture.

In the system of FIG. 12D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 109 interfaces via the S1 to the Serving Gateway 1245, which includes a Mobility Anchoring function 1247. According to this architecture, the MME (Mobility Management Entity) 1249 provides SAE (System Architecture Evolution) Bearer Control 1251, Idle State Mobility Handling 1253, and NAS (Non-Access Stratum) Security 1255.

One of ordinary skill in the art would recognize that the processes for providing cooperative spectrum sharing may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 13:
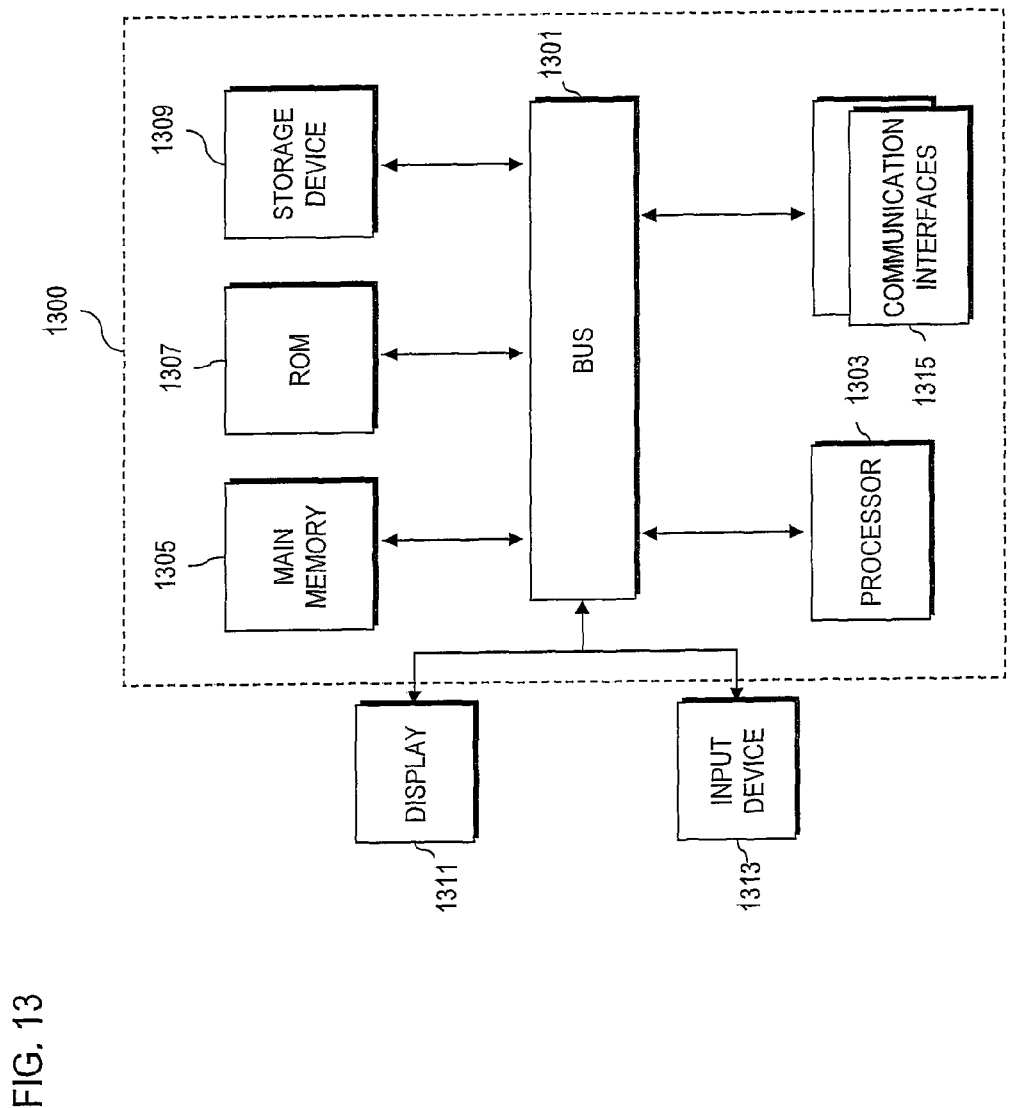
FIG. 13 is a diagram of hardware that can be used to implement an embodiment of the invention.

FIG. 13 illustrates exemplary hardware upon which various embodiments of the invention can be implemented. A computing system 1300 includes a bus 1301 or other communication mechanism for communicating information and a processor 1303 coupled to the bus 1301 for processing information. The computing system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions by the processor 1303. The computing system 1300 may further include a read only memory (ROM) 1307 or other static storage device coupled to the bus 1301 for storing static information and instructions for the processor 1303. A storage device 1309, such as a magnetic disk or optical disk, is coupled to the bus 1301 for persistently storing information and instructions.

The computing system 1300 may be coupled via the bus 1301 to a display 1311, such as a liquid crystal display, or active matrix display, for displaying information to a user. An input device 1313, such as a keyboard including alphanumeric and other keys, may be coupled to the bus 1301 for communicating information and command selections to the processor 1303. The input device 1313 can include a cursor control, such as a mouse, a trackball, or cursor direction keys, for communicating direction information and command selections to the processor 1303 and for controlling cursor movement on the display 1311.

According to various embodiments of the invention, the processes described herein can be provided by the computing system 1300 in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1300 also includes at least one communication interface 1315 coupled to bus 1301. The communication interface 1315 provides a two-way data communication coupling to a network link (not shown). The communication interface 1315 sends and receives electrical, electromagnetic, or optical signals that carry digital data streams representing various types of information. Further, the communication interface 1315 can include peripheral interface devices, such as a Universal Serial Bus (USB) interface, a PCMCIA (Personal Computer Memory Card International Association) interface, etc.

The processor 1303 may execute the transmitted code while being received and/or store the code in the storage device 1309, or other non-volatile storage for later execution. In this manner, the computing system 1300 may obtain application code in the form of a carrier wave.

The term "computer-readable medium" as used herein refers to any medium that participates in providing instructions to the processor 1303 for execution. Such a medium may take many forms, including but not limited to non-volatile media, volatile media, and transmission media. Non-volatile media include, for example, optical or magnetic disks, such as the storage device 1309. Volatile media include dynamic memory, such as main memory 1305. Transmission media include coaxial cables, copper wire and fiber optics, including the wires that comprise the bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 14:
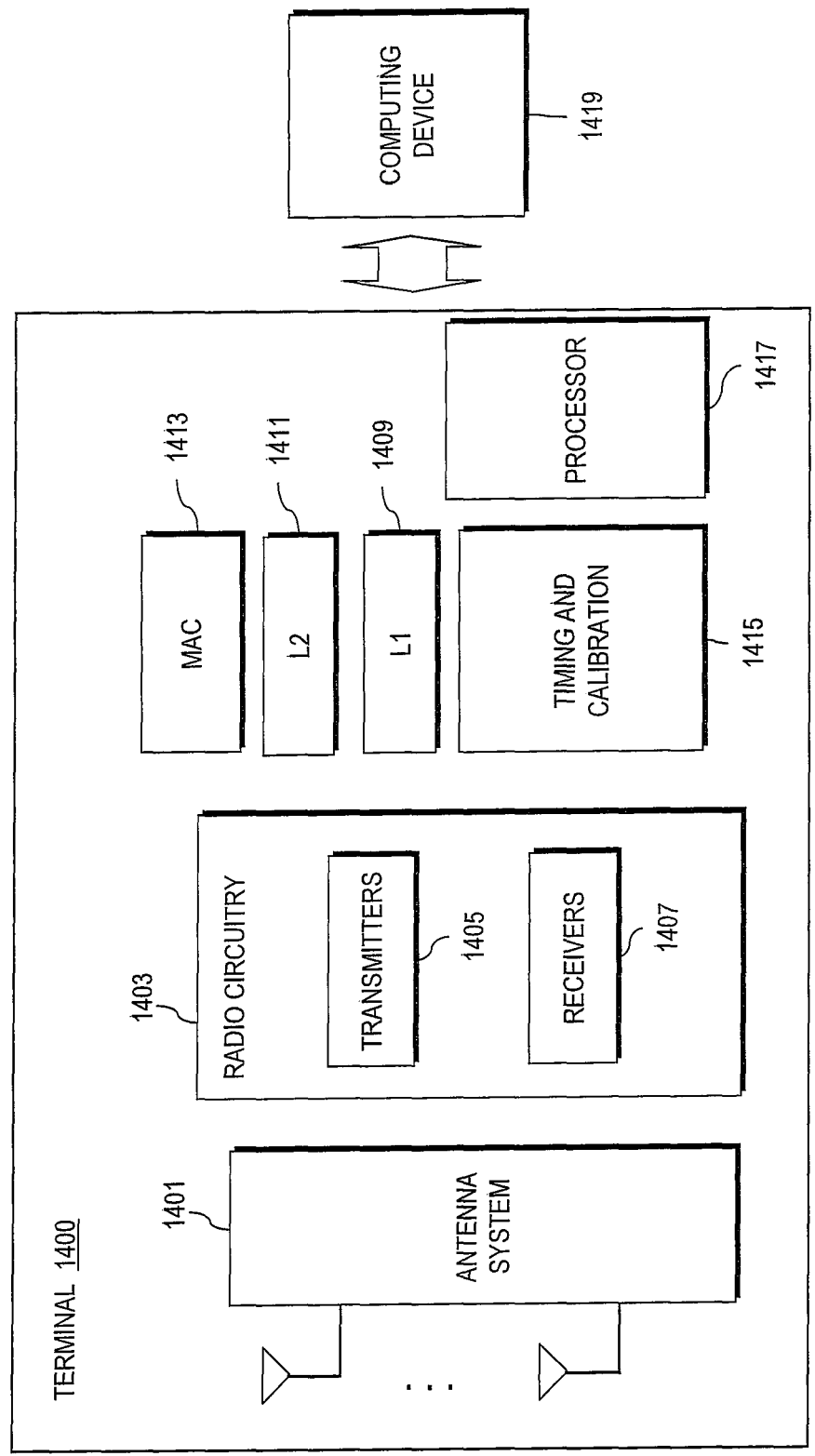
FIG. 14 is a diagram of exemplary components of a user terminal configured to operate in the systems of FIGS. 11 and 12, according to an embodiment of the invention.

FIG. 14 is a diagram of exemplary components of a user terminal configured to operate in the systems of FIGS. 11 and 12, according to an embodiment of the invention. A user terminal 1400 includes an antenna system 1401 (which can utilize multiple antennas) to receive and transmit signals. The antenna system 1401 is coupled to radio circuitry 1403, which includes multiple transmitters 1405 and receivers 1407. The radio circuitry encompasses all of the Radio Frequency (RF) circuitry as well as base-band processing circuitry. As shown, layer-1 (L1) and layer-2 (L2) processing are provided by units 1409 and 1411, respectively. Optionally, layer-3 functions can be provided (not shown). Module 1413 executes all Medium Access Control (MAC) layer functions. A timing and calibration module 1415 maintains proper timing by interfacing, for example, an external timing reference (not shown). Additionally, a processor 1417 is included. Under this scenario, the user terminal 1400 communicates with a computing device 1419, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining a threshold value associated with an acceptable level of interference to a first radio network; and
   generating a beacon message specifying the threshold value for transmission from the first radio network to one or more nodes of a second radio network that is configured to exchange traffic for mobile services,
   wherein the first radio network and the second radio network share spectral resources including adjacent bands for the respective radio networks, and the beacon message is used for controlling the level of interference to the first radio network caused by the one or more nodes of the second radio network, and
   wherein the beacon message is used to determine locations within the second radio network where a received signal of the first radio network is interfered.

2. A method according to claim 1, further comprising at least one of the following:
   generating a control message to specify the determined level of interference to the one or more nodes for adjusting a transmission parameter of the one or more nodes;
   applying a spreading code sequence to a signal representing the beacon message to increase range;
   estimating number of active ones of the nodes of the second radio network, and
   setting the threshold value based on the estimate and a maximum interference power allowed to the first radio network.

3. A method according to claim 1, further comprising:
   transmitting the beacon message to the second radio network;
   measuring strength of the beacon message by a node of the second radio network; and
   adjusting the transmission power of the node of the second radio network in response to the measurement.

4. A method according to claim 1, further comprising:
   collecting information about signal quality experienced by the first radio network, wherein the threshold value is set based on the collected information.

5. A method according to claim 1, wherein an exclusion zone is defined around the first radio network, the exclusion zone being modified based on the threshold value.

6. A method according to claim 1, further comprising transmitting the beacon message using an antenna that is configured to receive signals within the first radio network,
   wherein a signal representing the beacon message has at least one of a time duration and using a frequency that is configurable, wherein at least one of the time duration and the frequency being set to avoid introducing interference.

7. A method according to claim 1, further comprising carrying one or more sequences of one or more instructions in a computer-readable storage medium, wherein the one or more instructions are executable by one or more processors to cause the one or more processors to perform the method wherein the one or more instructions are executable by one or more processors to cause the one or more processors to perform the method.

8. An apparatus comprising:
   an interference module configured to determine a threshold value associated with an acceptable level of interference to a first radio network; and
   logic configured to generate a beacon message specifying the threshold value for transmission from the first radio network to one or more nodes of a second radio network that is configured to exchange traffic for mobile services,
   wherein the first radio network and the second radio network share spectral resources including adjacent bands, and the beacon message is used for controlling the level of interference to the first radio network caused by the one or more nodes of the second radio network, and
   wherein the beacon message is used to determine locations within the second radio network where a received signal of the first radio network is interfered.

9. An apparatus according to claim 8, further comprising:
   a beacon transmitter configured to transmit the beacon message to the second radio network, wherein the interference module is further configured to measure strength of a signal from the second radio network, and to adjust the threshold value in response to the measurement.

10. An apparatus according to claim 8, wherein the interference module further configured to collect information about signal quality experienced by the first radio network, wherein the threshold value is set based on the collected information.

11. An apparatus according to claim 8, wherein
    the interference module further configured to generate a control message to specify the determined level of interference to the one or more nodes for adjusting a transmission parameter of the one or more nodes.

12. An apparatus according to claim 8, wherein:
    the logic further configured to apply a spreading code sequence to a signal representing the beacon message to increase transmission range.

13. An apparatus according to claim 8, further comprising an antenna configured to transmit the beacon message, and to receive signals within the first radio network, wherein a signal representing the beacon message has a time duration that is configurable, the time duration being set to avoid introducing interference.

14. An apparatus according to claim 8, wherein
the interference module further configured to estimate number of active ones of the nodes of the second radio network, and to set the threshold value based on the estimate and a maximum interference power allowed to the first radio network.

15. A method comprising:
receiving a beacon message transmission from a first radio network, wherein the beacon message includes a threshold value associated with an acceptable level of interference with the first radio network; and
adjusting a transmission parameter associated with communication over a second radio network in response to the beacon message transmission,
wherein the first radio network and the second radio network utilize spectral resources without guard bands, and
wherein the beacon message is used to determine locations within the second radio network where a received signal of the first radio network is interfered.

16. A method according to claim 15, further comprising:
measuring signal strength of a signal from the second radio network;
determining level of interference based on the measured signal strength, transmit power of a node, and the threshold value; and
determining available spectrum based on the determined level of interference.

17. A method according to claim 15, further comprising carrying one or more sequences of one or more instructions in a computer-readable storage medium , wherein the one or more instructions are executable by one or more processors to cause the one or more processors to perform the method.

18. An apparatus comprising:
an interference module configured to receive a beacon message transmission from a first radio network, wherein the beacon message transmission includes a threshold value associated with an acceptable level of interference with the first radio network, and to adjust a transmission parameter associated with communication over a second radio network in response to the beacon message transmission,
wherein the first radio network and the second radio network utilize spectral resources without guard bands, and
wherein the beacon message transmission is used to determine locations within the second radio network where a received signal of the first radio network is interfered.

19. An apparatus according to claim 18, wherein the interference module is further configured to measure signal strength of the beacon message, and to determine level of interference based on the measured signal strength, transmit power of the apparatus, and the threshold value, the interference module being further configured to determine available spectrum based on the determined level of interference.

* * * * *